US010740204B2

(12) United States Patent
Jang et al.

(10) Patent No.: US 10,740,204 B2
(45) Date of Patent: Aug. 11, 2020

(54) METHOD AND APPARATUS FOR MONITORING MEMORY AND FOR DISPLAYING USE IN ELECTRONIC CONTROL DEVICE

(71) Applicants: HYUNDAI MOTOR COMPANY, Seoul (KR); KIA MOTORS CORPORATION, Seoul (KR)

(72) Inventors: Hoon Jang, Seoul (KR); In Su Kim, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 170 days.

(21) Appl. No.: 15/985,956

(22) Filed: May 22, 2018

(65) Prior Publication Data

US 2019/0188104 A1 Jun. 20, 2019

(30) Foreign Application Priority Data

Dec. 14, 2017 (KR) .................. 10-2017-0172033

(51) Int. Cl.
*G06F 11/00* (2006.01)
*G06F 11/30* (2006.01)
*G06F 11/36* (2006.01)

(52) U.S. Cl.
CPC ........ *G06F 11/3013* (2013.01); *G06F 11/004* (2013.01); *G06F 11/008* (2013.01); *G06F 11/3037* (2013.01); *G06F 11/36* (2013.01)

(58) Field of Classification Search
CPC .. G06F 11/3013; G06F 11/004; G06F 11/008; G06F 11/3037; G06F 11/36; G06F 11/0739; G06F 11/073; G06F 11/3612; G06F 11/3616; G06F 11/3636; G06F 11/3644

See application file for complete search history.

(56) References Cited

U.S. PATENT DOCUMENTS

| 2005/0102673 A1* | 5/2005 | DeWitt, Jr. ......... G06F 11/3636 718/100 |
| 2007/0006047 A1* | 1/2007 | Zhou ..................... G06F 11/348 714/38.1 |
| 2010/0131803 A1* | 5/2010 | Lamie ................. G06F 11/3604 714/38.1 |
| 2012/0096441 A1* | 4/2012 | Law ..................... G06F 11/3644 717/127 |
| 2012/0144241 A1* | 6/2012 | Son ....................... G06F 11/323 714/38.1 |

FOREIGN PATENT DOCUMENTS

KR 10-2013-0061449 A 6/2013

* cited by examiner

*Primary Examiner* — Joseph D Manoskey
(74) *Attorney, Agent, or Firm* — Morgan, Lewis & Bockius LLP

(57) ABSTRACT

An operating method of an electronic control device for performing at least one program including a plurality of functions includes: recognizing a function call depth of the plurality of functions; inserting a probe code into an interrupt service routine (ISR) and a maximum depth function with a maximum function call depth; calculating a use amount of a memory area when the maximum depth function with the probe code inserted into the maximum depth function is performed; and when the probe code is executed, outputting the maximum function call depth or the function call depth of the plurality of functions and the use amount when the ISR is performed.

17 Claims, 12 Drawing Sheets

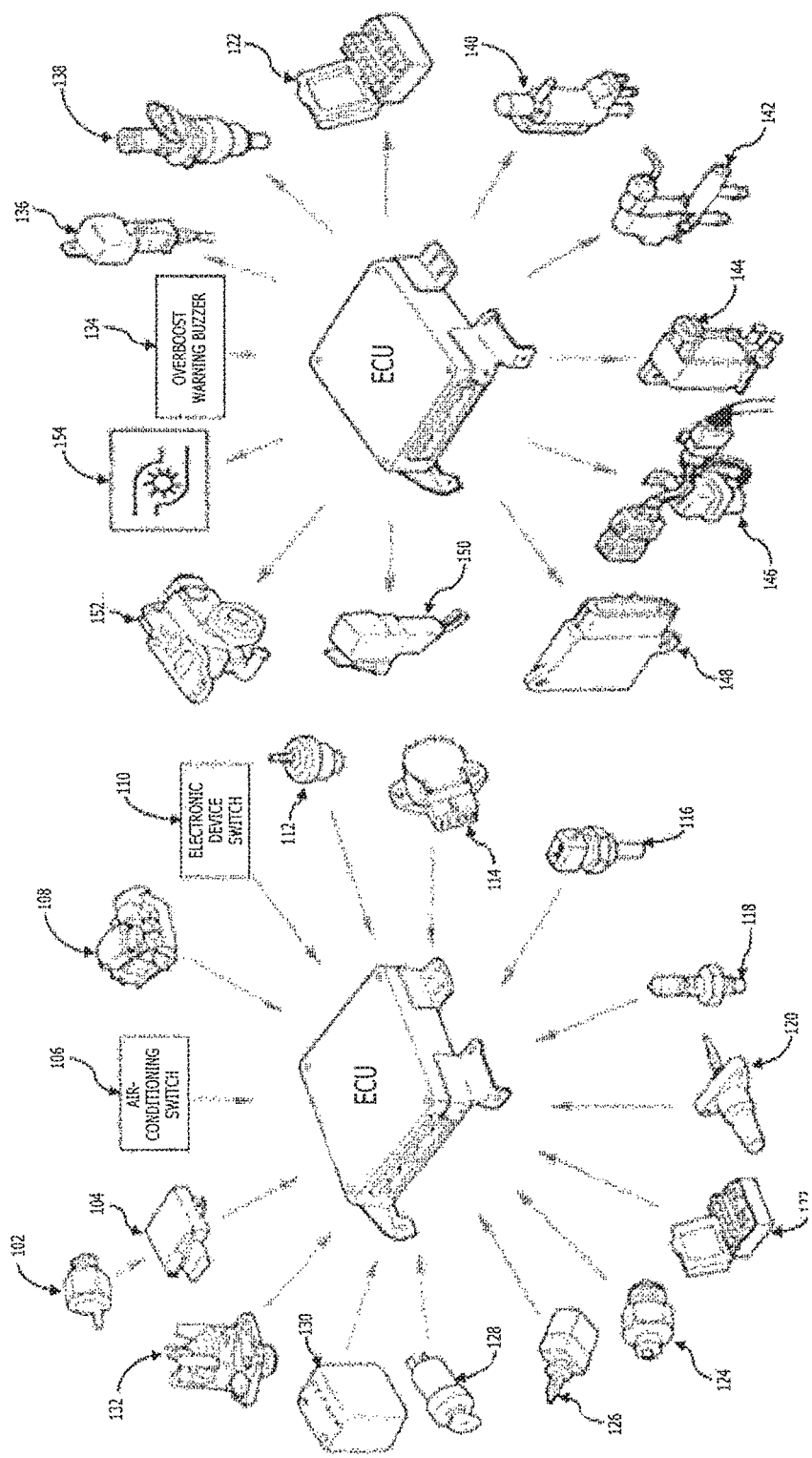

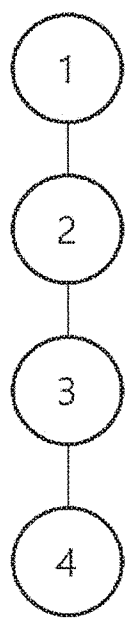
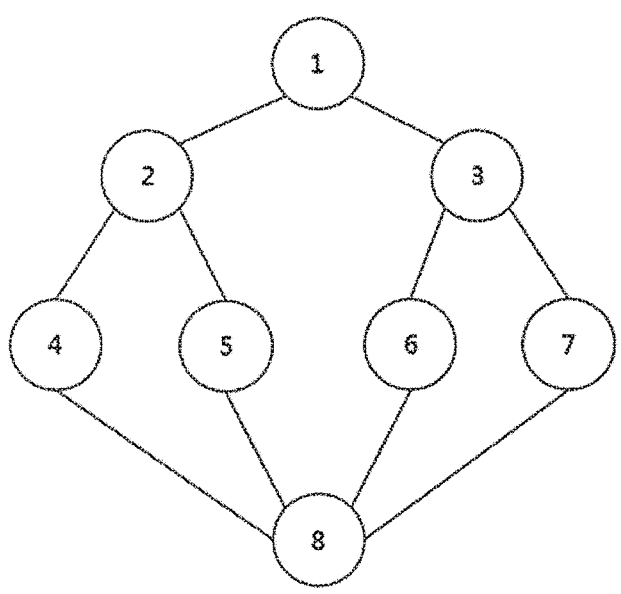
FIG. 3A                    FIG. 3B

METHOD AND APPARATUS FOR MONITORING MEMORY AND FOR DISPLAYING USE IN ELECTRONIC CONTROL DEVICE

This application claims the benefit of Korean Patent Application No. 10-2017-0172033, filed on Dec. 14, 2017, which is hereby incorporated by reference as if fully set forth herein.

BACKGROUND

The present disclosure relates to a method and apparatus for monitoring a memory and for displaying use in an electronic control device, and more particularly, to an apparatus and method for monitoring use of a memory used in a plurality of control programs and a control routine performed by an electronic device included in a vehicle and for displaying the use to a user.

BACKGROUND

A vehicle for providing convenience of a driver or a passenger includes a plurality of electronic control devices. An eco-friendly vehicle such as a hybrid vehicle, an electric vehicle, and a hydrogen vehicle includes a larger number of electronic control devices than a vehicle operated by an engine using a fossil fuel.

An electronic control device or also known as "ECU" included in a vehicle may include an embedded system with a microprocessor installed therein. The embedded system refers to an application system including hardware and software for performing a specific function and the embedded system may be used in a field such as electric component control, robot control, and process control of a vehicle.

Since a control system for an eco-friendly vehicle is driven using driving force of a motor other than an engine, the system includes various controllers such as a motor controller for controlling a motor, an inverter, and the like, and a hybrid control unit (HCU) for controlling an overall operation of various electrical components of a vehicle, and thus, overall driving performance of a vehicle may be maintained when a real time operating system (RTOS) of each controller is managed without any problem.

When a program is executed in a control system of a vehicle, a memory required to execute a program may be allocated. The memory allocated for a program includes a code area (or a text area), a data area, a heap area, and a stack area. The stack area is a temporary memory area that is automatically used by a program and stores data that is temporarily used and then disappears, such as a local parameter, parameter, and a return value. While a vehicle travels, a control system needs to monitor, control, and manage electronic devices in a vehicle in response to a vehicle driving environment, a user/driver input, manipulation, and so on in real time. For example, a real-time operating system (RTOS) for managing a control system of a vehicle may be used in a STACK area in a memory.

In a procedure in which a plurality of programs or a plurality of functions are executed, in a stack area allocated for each program, each function, and each parameter, a program, a function, and a parameter use all areas allocated thereto and invades an area that is not allocated thereto to store information thereof. This case is referred to as stack overflow. Stack overflow may cause a problem such as program crash and stack overflow in a vehicle control system may adversely affect driving safety.

SUMMARY

An object of the present disclosure is to provide a method and an apparatus for determining whether a threshold value exceeds when a memory use amount or a maximum value of a stack required by a user from a memory amount determined by the user with respect to the memory use amount in a vehicle.

Another object of the present disclosure is to provide a method and an apparatus for measuring a memory use amount and predicting whether an error occurs to prevent a case in which vehicle memory use amount requirements exceed.

Another object of the present disclosure is to provide a method and an apparatus for checking an actual use amount of a stack using a probe code at a corresponding point since a stack of a program in a vehicle controller reaches a maximum value at a point in which a function or interrupt performed in response to a user request is called a maximum number of times.

Another object of the present disclosure is to provide a method and apparatus for monitoring whether overflow occurs and preventing overflow in a memory by inserting a probe code into a function and an interrupt routine performed by a vehicle control system to calculate a memory use amount for each function and inserting the probe code into a function with a function with a maximum call depth to determine a worst scenario.

Another object of the present disclosure is to provide a method and apparatus for easily maintaining, repairing, and managing a vehicle by visualizing and displaying a path or depth by which functions performed by the vehicle control system is performed, and use of a memory.

Additional advantages, objects, and features of the invention will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, according to an exemplary embodiment of the present disclosure, an operating method of an electronic control device for performing at least one program including a plurality of functions, the method including: recognizing a function call depth of the plurality of functions; inserting a probe code into an interrupt service routine (ISR) and a maximum depth function with a maximum function call depth; calculating a use amount of a memory area when the maximum depth function with the probe code inserted into the maximum depth function is performed; and when the probe code is executed, outputting the maximum function call depth or the function call depth of the plurality of functions and the use amount when the ISR is performed.

The probe code may be inserted into start and end positions of the maximum depth function and the ISR.

The ISR may be independently executed from the program.

The method may further include comparing a threshold value of the use amount, set in response to the transmitted function call depth, and the transmitted use amount, and performing a fail-safe logic in response to a comparison result.

The method may further include displaying reason and result for performing the fail-safe logic.

The memory area may be a stack area.

The calculating of the use amount may include determining a total amount of the use amount using allocated start and end addresses of the stack area, determining a current use amount using the use amount up to a current address from the start address, and determining a rate of the current use amount to the total amount.

The method may further include displaying the function call depth, the use amount, and visualization information.

According to another exemplary embodiment of the present disclosure, an application program may be recorded in a non-transitory computer readable recording medium for executing the method by executing the program d by a processor.

According to another exemplary embodiment of the present disclosure, a non-transitory computer readable recording medium may have recorded thereon an application program for executing the method by executing the program d by a processor.

According to another exemplary embodiment of the present disclosure, an electronic control device for executing at least one program including a plurality of functions, including at least one first storage configured to storage the at least one program, at least one processor configured to execute the at least one program, and a second storage configured to store data or a value generated or required in a program of executing the at least one program stored in the first storage, wherein the at least one processor recognizes a function call depth of a function executed by the program, executes a probe code inserted into an interrupt service routine (ISR) and a maximum depth function with a maximum function call depth, calculates a use amount of a memory area in the second storage when the maximum depth function with the probe code inserted into the maximum depth function is performed, and outputs the maximum function call depth or the function call depth of the plurality of functions and the use amount when the ISR is performed, when the probe code is executed.

The probe code may be inserted into start and end positions of the maximum depth function and the ISR.

The ISR may be independently executed from the program.

The at least one processor may compare a threshold value of the use amount, set in response to the transmitted function call depth, and the transmitted use amount, and perform a fail-safe logic in response to a comparison result.

The electronic control device may further include a display device configured to display reason and result for performing the fail-safe logic or to display the function call depth, the use amount, and visualization information.

The memory area may be a stack area.

When a function executed by the program may be called by the processor, the stack area may be generated, and when the function is terminated, the stack area is returned.

The at least one processor may determine a total amount of the use amount using allocated start and end addresses of the stack area, determine a current use amount using the use amount up to a current address from the start address, and determine a rate of the current use amount to the total amount.

The electronic control device may further include a transmitter configured to transmit a function identifier of the maximum depth function and the interrupt service routine (ISR), the function call depth, the use amount, and visualization information through a wireless communication network, and an Ethernet port configured to transmit a function identifier of the maximum depth function and the interrupt service routine (ISR), the function call depth, the use amount, and visualization information.

The second storage may further include a data area for storing global, static, array, or structure and a heap area that is dynamically allocated as necessary, and the function call depth may be recognized through a depth first search (DFS) algorithm.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A and 2B are diagrams for explanation of devices in a vehicle connected to a vehicle control system according to an exemplary embodiment of the present disclosure;

FIGS. 3A and 3B are diagrams showing a program structure of a control system according to an exemplary embodiment of the present disclosure;

DETAILED DESCRIPTION

Reference will now be made in detail to the preferred embodiments of the present disclosure, examples of which are illustrated in the accompanying drawings. In addition, the suffixes "module" and "unit" of elements herein are used for convenience of description and thus can be used interchangeably and do not have any distinguishable meanings or functions.

In description of exemplary embodiments, it will be understood that, when an element is referred to as being "on" or "under" another element, the element can be directly on another element or intervening elements may be present. In addition, when an element is referred to as being "on" or "under" another element, this may include the meaning of an up direction or a down direction based on one component.

Figure 1:
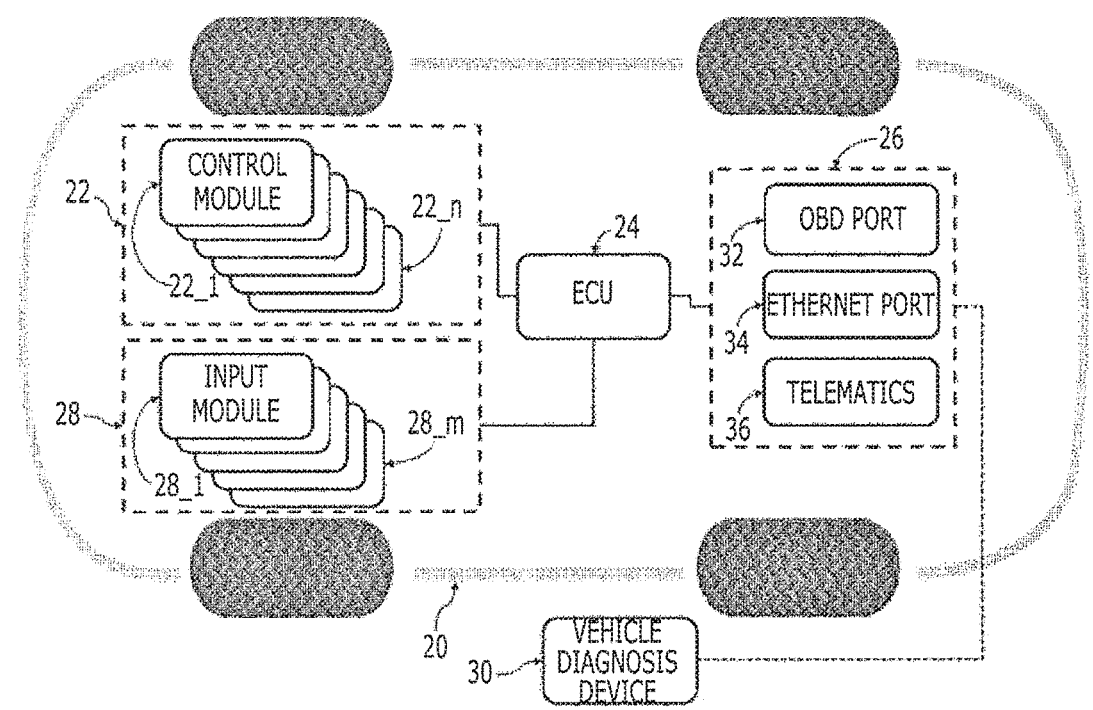
FIG. 1 is a diagram for explanation of connection between a control system included in a vehicle and a vehicle diagnosis device according to an exemplary embodiment of the present disclosure.

FIG. 1 is a diagram for explanation of connection between a control system included in a vehicle and a vehicle diagnosis device.

A vehicle 20 may include a first electrical device 22 and a second electrical device 18. The second electrical device 28 may include a plurality of input modules 28_1 to 28_m for collecting, providing, and transmitting information required for driving to a user, a driver, or a passenger, information required during driving, or information for reinforcing driving safety. The first electrical device 22 may include a plurality of input modules 22_1 to 22_n for controlling the vehicle 20 in response to a command that is determined, identified, and transmitted by a control system 24 according to information related to a driving environment, driver manipulation, and a driving state of the vehicle 20, which are detected during driving. Here, m and n are a natural number equal to or greater than 2.

Here, the first electrical device 22 and the second electrical device 28 may include the same controller or control module or include different controllers or control modules. The plurality of electronic control modules 22_1 to 22_n and the plurality of input modules 28_1 to 28_m that are included in the first electrical device 22 and the second electrical device 28, respectively, may be connected to each other through a vehicle network to transmit and receive data. The control system 24 may include an information processing device or the like for performing computation according to a preset program and function based on collected information to generate and process new information as well as an information collection device such as a sensor and a camera.

The plurality of electronic control modules 22_1 to 22_n and the plurality of input modules 28_1 to 28_m may be operatively connected to each other via a lower network structure through the control system 24. The control system 24 may include a computer or software for enabling communication between difference communication networks or networks using a protocol, may be a network point that functions as an inlet for entrance into different networks, and may be connected to a gateway that functions as a path between different types of networks.

A vehicle diagnosis device 30 for diagnosis of the plurality of electronic control modules 22_1 to 22_n and the plurality of input modules 28_1 to 28_m installed in the vehicle 20 may be connected to or may be operatively connected to the vehicle 20. The diagnosis device 30 of a vehicle electronic control module may diagnose a plurality of controllers that are connected through a plurality of vehicle networks using different communication methods. The diagnosis device 30 of the vehicle electronic control module may be physically separated from a vehicle but may be configured in the form of a terminal that is connectable through ports installed in a vehicle. In some embodiments, the diagnosis device 30 of the vehicle electronic control module may be configured in the form of a network server for checking the plurality of electronic control modules 22_1 to 22_n and the plurality of input modules 28_1 to 28_m installed in a vehicle and collecting data through a wired and wireless communication network.

There may be an input and output device 26 for transmitting data for performing a diagnosis process and a diagnosis procedure and collecting data a result between the diagnosis device 30 and the control system 24. The input and out device 26 may be a hardware device used by a human or other system to communicate with a computer. For example, the input and output device 26 may include an on-board diagnostics (OBD) port 32 installed in a vehicle. Here, on-board diagnostics (OBD) may refer to diagnosis standard for checking and controlling an electronic/electrical operating state of the vehicle 20. At initial stages, the OBD is used to increase maintenance efficiency of electronic components such as an engine but, in addition to this purpose, the OBD may function as an interface as a trip computer for showing various vehicle information items to a driver.

The vehicle 20 may include an Ethernet port 34. When a vehicle network includes only a controller area network (CAN), the Ethernet port 34 may not be required. However, as the number of the plurality of electronic control modules 22_1 to 22_n installed in the vehicle 20 is increased and the amount of data transmitted and received by the plurality of electronic control modules 22_1 to 22_n and the plurality of input modules 28_1 to 28_m is increased, a vehicle network may additionally uses Ethernet communication as well as a controller area network (CAN). For example, a maximum transmission bandwidth of a controller area network (CAN) may be 1 Mbps. When this speed is used, if the number of the plurality of electronic control modules 22_1 to 22_n and the plurality of input modules 28_1 to 28_m in a vehicle is increased and data traffic is remarkably increased due to real time video transport (e.g., Topview monitoring) and so on, there is a limit in configuring a network vehicle only using CAN communication. A data transfer rate of CAN-FD may be available up to 2 Mbit/s in a multi drop network and up to 5 Mbit/s in point-to-point communication and, in the case of Ethernet, a data transfer rate of 1 Gbps is also proposed. Accordingly, in a procedure of checking and controlling an electronic/electrical operating state of the vehicle 20, the vehicle diagnosis device 30 may be connected through the Ethernet port 34.

In addition, a telematics device 36 installed in the vehicle 20 may be used as the input and output device 26. The telematics device 36 may be an example of a device for providing a vehicle integrated multimedia service using positional information and a wireless communication network, may provide safe driving, emergency rescue, traffic guidance service, and so on to a driver, and may provide an infotainment service such as the Internet, a movie, a game, and multimedia to a passenger. The telematics device 36 may be operatively associated with a network service for diagnosing an operation of devices in a vehicle, may transmit a diagnosis message for checking the plurality of electronic control modules 22_1 to 22_n and the plurality of input modules 28_1 to 28_m installed in the vehicle and collecting data, and may transmit data transmitted from the plurality of electronic control modules 22_1 to 22_n and the plurality of input modules 28_1 to 28_m installed in the vehicle to a network server.

A network in the vehicle 20 may include Ethernet communication, controller area network (CAN) communication, a CAN with flexible data-rate (CAN-FD), local interconnect network (LIN) communication, media oriented systems transport (MOST) communication, and so on. Here, the input and output device 26 may include at least one of the OBD port 32, the Ethernet port 34, and the telematics device 36.

The vehicle 20 may include a plurality of controllers using different communication methods, and thus, the input and output device 26 and at least one vehicle gateway may be connected in different methods. For example, at least one of the Ethernet port 34 and the telematics device 36 may be connected to at least one vehicle gateway based on an Ethernet communication method. On the other hand, the OBD port 32 as the input and output device 26 may be connected to at least one vehicle gateway based on a CAN communication method.

The control system 24 may be a device such as an electronic control unit (ECU) for controlling driving of the vehicle 20 and may be operatively connected to the plurality of electronic control modules 22_1 to 22_n and the plurality of input modules 28_1 to 28_m to input and output data and a command. The control system 24 may be an electronic control device for executing at least one program including a plurality of functions. The control system 24 may include at least one first storage for storing at least one program, at least one processor for executing at least processor, and a second storage for storing a data or value that is generated or required in a procedure of executing the at least one program stored in the first storage.

FIGS. 2A and 2B are diagrams for explanation of devices in a vehicle connected to a vehicle control system. In detail, FIGS. 2A and 2B show an example of the plurality of electronic control modules 22_1 to 22_n and the plurality of input modules 28_1 to 28_m included in the first electrical device 22 and the second electrical device 28 that are operatively connected to the control system 24 shown in FIG. 1. For example, FIG. 2A shows a device or module for inputting data to an electrical control unit (ECU) and FIG. 2B shows a device or module controlled by an electrical control unit (ECU) or for transmitting data.

Referring to FIG. 2A, the electrical control unit (ECU) may be operatively connected to an air-conditioning switch 106, an airflow meter 108, an electronic device switch 110, a power-steering pressure switch 112, a throttle sensor 114, a coolant thermos sensor 116, an oxygen sensor 118, an air-intake sensor 120, a diagnosis connector 122, a clutch switch 124, a stop light switch 126, an ignition switch 128, a battery 130, a distributor 132, a knock sensor 102, a knock sensor controller 104, and so on. The electrical control unit (ECU) may recognize state information transmitted from each device to collect information on a vehicle state and driver manipulation.

Referring to FIG. 2B, based on the collected information, the electrical control unit (ECU) may control an idle speed controller/actuator (ISC or ISA) valve 152, a turbocharger indicator 154, an over boost warning buzzer 134, a circuit-opening relay 136, a fuel injector 138, a diagnosis connector 122, a pressure-regulator control solenoid value 140, a waste gate value 142, a purge control solenoid value 144, a fuel pump resistor/relay 146, an igniter 148, an air-conditioning relay 150, and so on.

Referring to FIGS. 1 and 2, in some embodiments, a control system (ECU of FIGS. 2A and 2B or 24 of FIG. 1) may monitor and control most devices such as an engine, a motor, a brake, and a transmission of a vehicle. The control system may be embodied as a computing device including at least one processor and at least one memory and may store at least one program for operative connection with the plurality of devices in a vehicle, which are described above with reference FIGS. 1, 2A, and 2B.

FIGS. 3A and 3B are diagrams showing a program structure of a control system. At least one program included in the control system may include a plurality of functions. Here, a function may be considered as a partial code or a program unit to be called to perform a specific operation such as generation of specific information and data through collected information or control of devices in a vehicle in response to input information and data. In detail, FIG. 3A shows a case in which functions are sequentially called in a procedure of executing a program, and FIG. 3B shows a case in which functions are called via various call paths in a procedure of executing a program.

As shown in FIG. 3A, functions 1, 2, 3, and 4 may be sequentially called and performed in response to a driving environment or driver manipulation during vehicle driving. However, a vehicle driving environment or driver manipulation is very complex, and thus, the case shown in FIG. 3A in which functions in a program are sequentially called and performed may not be general.

Referring to FIG. 3B, functions 1, 2, 3, 4, 5, 6, 7, and 8 in a program may be called in various paths and various orders in response to in response to a vehicle driving environment or driver manipulation. Referring to FIGS. 1, 2A, and 2B, a device and an apparatus that are operatively connected to a control system are very complex, and thus, a function for controlling the device and the apparatus may also be very complex.

Figure 4:
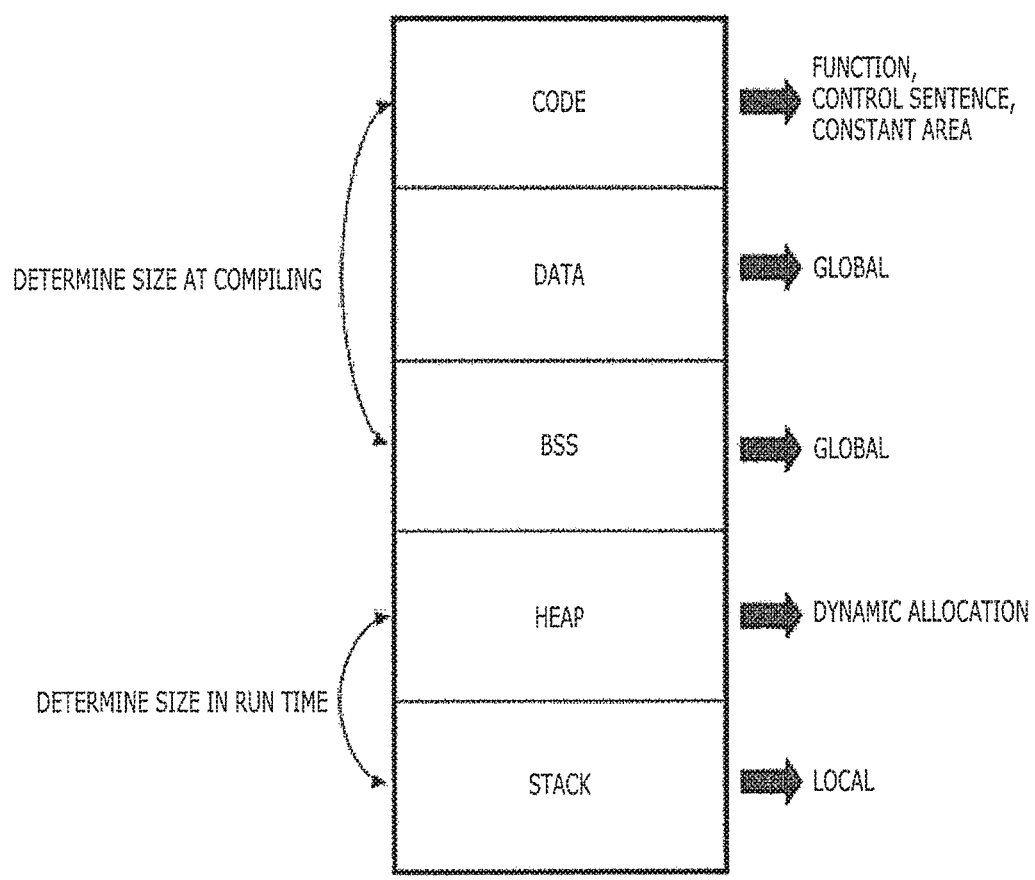
FIG. 4 shows a structure of a memory in a control system according to an exemplary embodiment of the present disclosure.

FIG. 4 shows a structure of a memory in a control system.

As shown in the drawing, the memory in the control system may include a plurality of areas including a code area, a data area, a block started by symbol (BSS) area, a heap area, and a stack area.

In detail, the code area may be a memory area configuring a code of a program and may store a Hex file or a BIN file including a machine language code, a function, and so on. The data area may be an initialized data segment for storing global, static, array, structure, and so on and may store initialized data. Uninitialized variables may be stored in the block stated symbol (BSS) area. Here, the code area, the data area, and the BSS area may be determined when a program is compiled. For example, the data area may be generated when a program is executed and may be returned when the program is terminated.

With regard to the heap area and the stack area, a size of an area occupied in a memory may be determined when a program is executed in run time. The heap area may be a memory area positioned to dynamically allocate a memory as necessary, may be referred to as a dynamic memory area, and may be an area that is referred to and used by only a memory address value. The stack area may be a temporary memory area used by a program and may store data that is temporarily used and then disappears, such as a local parameter, a parameter, and a return value. The stack area may be generated when a function is called and may be return to a system when the function is terminated. A size of the stack area may be allocated to each process, but a stack size is fixed when a program is located on a memory, and thus, a stack size is not capable of being changed in rum time and, the stack size is automatically increased/reduced when a command is executed, and thus, a last address of a memory is normally determined as a position and a front portion from a last portion of the memory may be allocated to a function.

Due to the above feature of the stack area of the memory, when a function is performed, a memory space allocated to the function may overflow (e.g., when a program attempts to use an available space or more in a call stack), which may be referred to as stack overflow. When a stack pointer as a memory position allocated to a function exceeds a boundary of a stack function, overflow may also occur.

As described with reference to FIG. 3B, each function may not be terminated after being performed once but may be re-performed after other functions are performed. In addition, when a program includes a recursion function for employing a method of referring thereto when the function is defined in the program, it may be difficult to ensure a range occupied by the corresponding function in a stack area.

Figure 5:
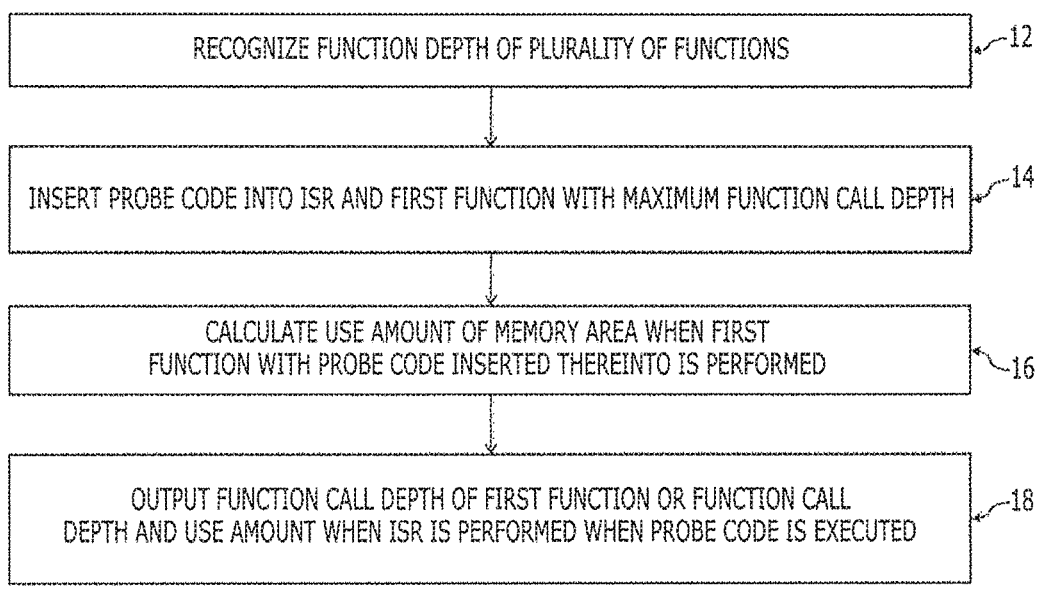
FIG. 5 shows a first example of an operating method of a control system according to an exemplary embodiment of the present disclosure.

FIG. 5 shows a first example of an operating method of a control system.

As described above with reference to FIGS. 1 to 4, a control system may include and execute at least one program including a plurality of functions that are operatively connected to a device and an apparatus included in a vehicle. The operating method of the control system may include recognizing a function call depth of a plurality of functions (S12), inserting a probe code into an interrupt service routine (ISR) and a maximum depth function with a maximum function call depth (S14), calculating a use amount of a memory area when the maximum depth function with the probe code inserted thereinto is performed (S16), and outputting a function call depth of the maximum depth function or a function call depth and the use amount when the interrupt service routine (ISR) is performed, when the probe code is executed (S18).

In some embodiments, a probe code included in a program may be inserted into a start and end of the maximum depth function and the interrupt service routine (ISR). Here, the ISR may be a machine language code routine for processing a specific function in response to interrupt generated by interrupt reception and may be independently executed from a program performed by a control system. For example, while a plurality of functions in a program are sequentially, parallelly, and arbitrarily performed, a probe code included in a function with a deepest function call depth or an arbitrarily performed interrupt service routine (ISR) may check and output use of a memory device.

As described above with reference to FIG. 4, a stack area in a memory may be used to store data and so on in a procedure performed after functions in a program are performed and a stack pointer (position) may be continuously changed. A whole size of the stack area is fixed, and thus, a used degree of the stack area may be recognized using a position of the stack pointer.

Although not shown, the operating method of the control system may further include comparing a threshold value of a use amount set in response to a transmitted function call depth and a transmitted use amount, and performing a fail-safe logic in response to a comparison result. When the use amount of the stack area is checked and the use amount exceeds a recommended or proposed level during program execution, the control system may perform a safe logic to prevent stack overflow from occurring. For example, when a depth of a function called in a program is 5, a threshold value of a memory use amount may be preset to 70%. When a function with a depth of 5 is called, if a memory use amount is checked and the actual use amount exceeds 70%, it may be seen that more stack areas are used than expected during program execution.

When an error occurs in a memory of a control system like overflow, the device and the apparatus in the vehicle described above with reference to FIGS. 1 and 2 may not be smoothly controlled. In this case, a throttle value may not be appropriately controlled, and thus, an error such as sudden unintended acceleration may occur.

In some embodiments, when an actually use amount exceeds a reference value but not a relative value such as 90% and 95%, the fail-safe logic may be performed. That is, when the memory use amount occupies most of a total amount of the memory, additional execution of a function to be performed by a program may be stopped and a routine for lowering the memory use amount may be performed, thereby preventing overflow from occurring.

Although not illustrated, the operating method of the control system may further include displaying the reason and result of the fail-safe logic when the fail-safe logic is executed. In the case of maintenance, repair, and management of a vehicle driver or a vehicle, as well as the fail-safe logic, whether a procedure performed by the control system in the vehicle is smoothly performed may be monitored.

In some embodiments, to calculate a use amount of a stack area in a memory, a total amount may be predetermined using an allocated start and last addresses of the stack area. Then, up to a current address as a stack point from end (start address) of a memory may be determined as a current use amount. Then, a rate of the current use amount to the total amount may be determined.

When a current use amount of a stack area in a memory is recognizable through a probe code, a function call depth of a function that is currently called and performed, a current use amount, current time information, and so on may be displayed. These types of information may be displayed by visualization such as a table and a graph to a user (a driver or a manager) to transmit a real time situation of use of a memory in a control system. When it is possible to feedback the real time situation of use of a memory in the control system, a vehicle manufacturer, a control system developer, and so on may more easily recognize problems and issues of a control system installed in a current vehicle and may provide a program enhanced via a method such as recall and firmware upgrade to a vehicle owner and driver.

Figure 6:
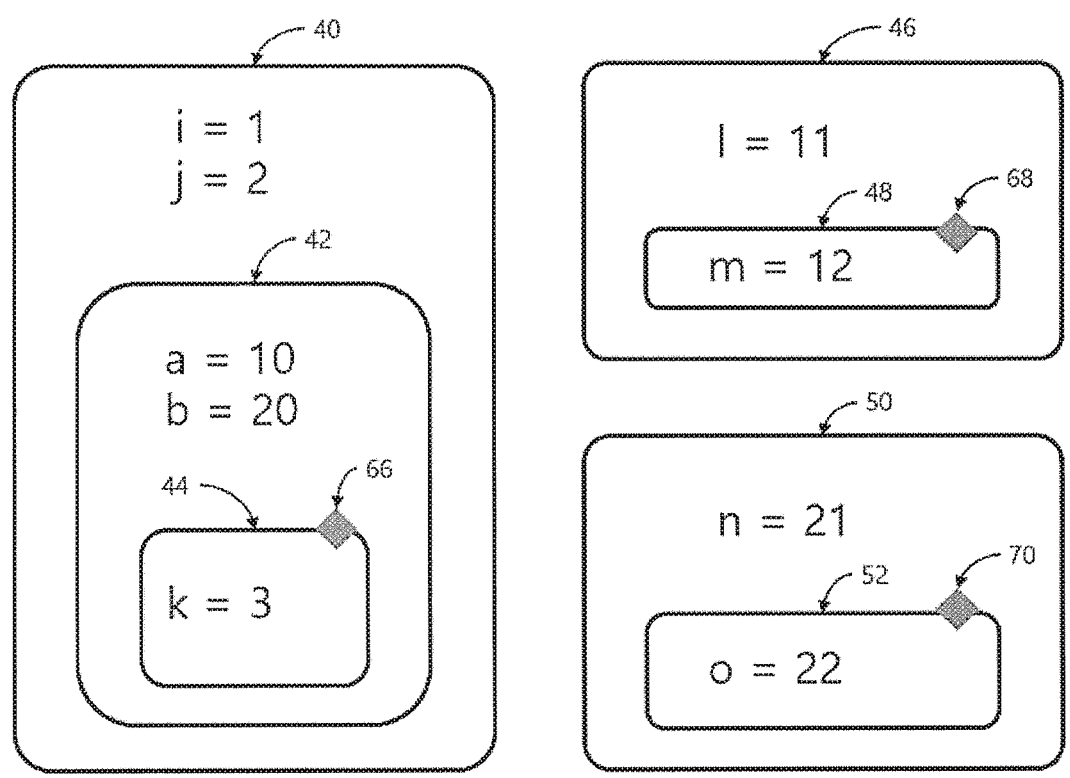
FIG. 6 shows a first example of a position of a program of a control system, into which a probe code is inserted according to an exemplary embodiment of the present disclosure.

FIG. 6 shows a first example of a position of a program of a control system, into which a probe code is inserted.

As shown in the drawing, a program 40 may include a plurality of functions 42 and 44. In addition, the control system may include a plurality of ISRs 46 and 50 that are independently from the program 40.

A probe code 66 in a program may be included in a start position of a maximum depth function 44 with a deepest function call depth in the program 40. The probe code 66 may also be included in a start position of the functions 48 and 52 included in the plurality of ISRs 46 and 50.

In general, a program included in a control system may be completed via a plurality of simulation and debugging operations and the case in which overflow occurs in a memory may not frequent. An amount of a memory to be allocated for a program may be increased to prevent overflow. In spite of this, when overflow occurs, the possibility that overflow occurs in a procedure of performing the maximum depth function 44 with a deepest call depth of a function called in the program is very high. Accordingly, the probe code 66 for detection of overflow may be included in the maximum depth function 44 with a deepest function call depth. This may prevent resource of a control system from being wasted when a probe code is included in each of the plurality of functions in a program.

When probe codes 68 and 70 are included in a start position of functions 48 and 52 included in a plurality of ISRs 46 and 50, a user situation of a memory in a control system may be advantageously monitored whenever ISR is performed.

Figure 7:
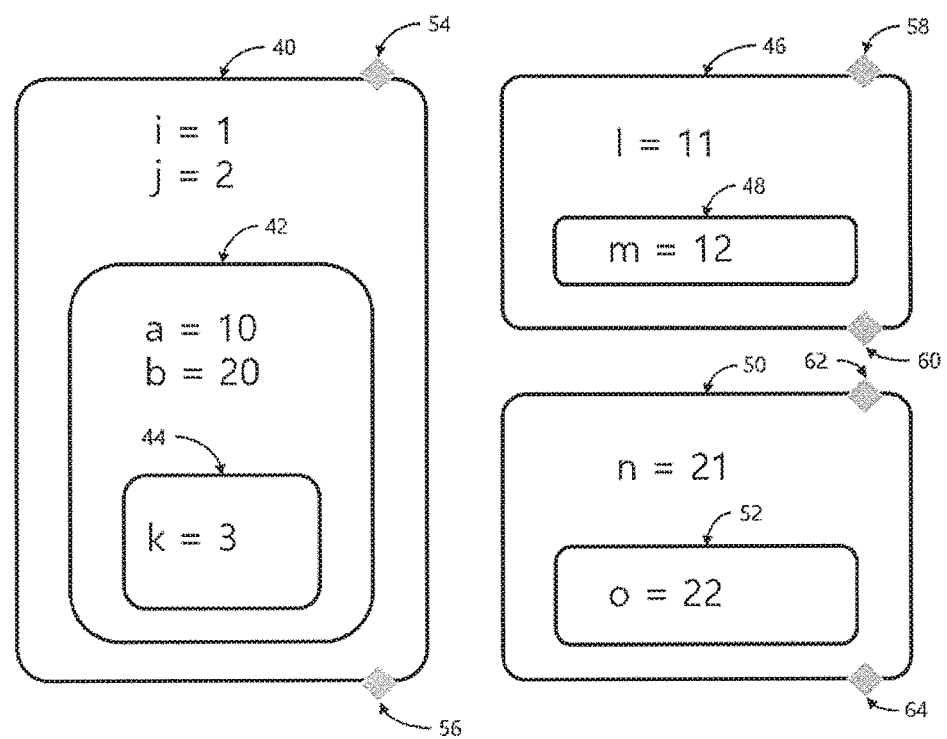
FIG. 7 shows a second example of a position of a program of a control system, into which a probe code is inserted according to an exemplary embodiment of the present disclosure.

FIG. 7 shows a second example of a position of a program of a control system, into which a probe code is inserted.

As shown in the drawing, the program 40 may include the plurality of functions 42 and 44. In addition, the control system may include the plurality of ISRs 46 and 50 that are independently from the program 40. In the present embodiment, probe codes 54 and 56 may be arranged at start and end positions of the program 40. Probe codes 58, 60, 62, and 54 may also be included in start and end positions of the plurality of ISRs 46 and 50.

In some embodiments, a plurality of programs 40 performed in the control system may be a multi process. Each program may have one thread, but depending on an environment, a multi thread for simultaneously executing two or more threads may be executed. When a multi process or a multi thread is executed, a current situation related to use of a memory may be recognized through a probe code included in start and end positions of each program or each thread.

Referring to FIGS. 6 and 7, efficiency of detecting a use situation of a memory may be greatly varied depending on a position into which a probe code is inserted. Accordingly, it may be necessary to determine a position into which a probe code is inserted in response to an operation of a program included in the control system. On the other hand, when a program code is arranged every function called in each program, overall performance of the control system may be degraded.

Figure 8:
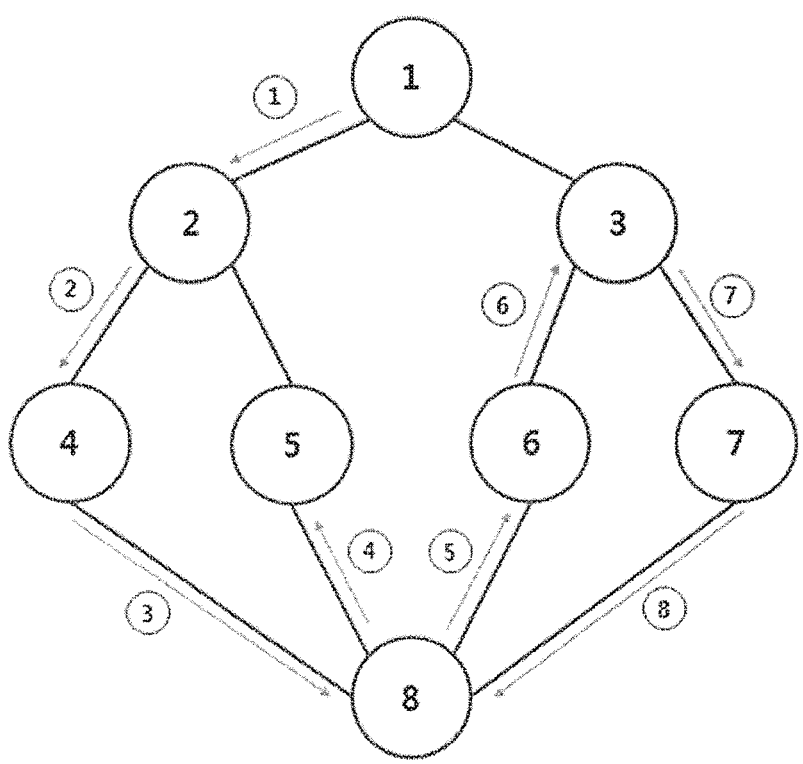
FIG. 8 shows an example of a method of determining a function call depth of functions included in a program of a vehicle control system according to an exemplary embodiment of the present disclosure.

FIG. 8 shows an example of a method of determining a function call depth of functions included in a program of a vehicle control system. In some embodiments, various methods of determining a function call depth may be applied but, to determine a function call depth related to a use situation of a stack area of a memory, a depth first search (DFS) algorithm may be employed.

As shown in the drawings, the case in which eight functions 1, 2, 3, 4, 5, 6, 7, and 8 are included in a program may be assumed. In addition, the case in which moving or call between the eight functions (according to a condition in a function) is performed along a line connection therewith may be assumed. The depth first search (DFS) algorithm may determine a function call depth after movement to any road as long as the road is not visited, indiscriminately. First, it may be assumed that a position starts from a maximum depth function 1, moves to a second function 2, and is sequentially called from the second function.

In detail, as shown in the drawing, according to a visiting order between functions, functions are visited in an order '1→2→4→8→5→8→6→3→7'. First, a current position is a function 1 and functions 2 and 3 are not visited, and thus, the current position is first moved to a function 2(①). Then, the current position is a function 2, function 1 is visited, and functions 4 and 5 are not visited, and thus, the position is first moved to function 4(②). Then, the current position is function 4, function 2 is visited, and function 8 is not visited, and thus, the position is moved to function 8(③). Then, the current position is function 8, function 4 is visited, and functions 5, 6, and 7 are not visited, and thus, the position is first moved to function 5 (④). Then, after the position is moved to function 5, function 2 and function 8 are already visited, and thus, there is no place to be visited any longer, the position is returned to a position that is previously visited. Then, a current position is function 8, functions 4 and 5 are visited, and functions 6 and 7 are not visited, and thus, the position is first moved to function 6(⑤). Then, the current position is function 6, function 8 is visited, and function 3 is not visited, and thus, the position is moved to function 3 (⑥). Then, the current position is function 3, functions 1 and 6 are visited, and function 7 is not visited, and thus, the position is moved to function 7 (⑦). Then, the current position is function 7, function 3 is visited, and function 8 is already visited, and thus, the position is not moved any longer (⑧). The aforementioned depth first search (DFS) algorithm may use a stack area and may be usefully used when a call depth of a function is called from a material structure such as a tree or a graph.

Figure 9:
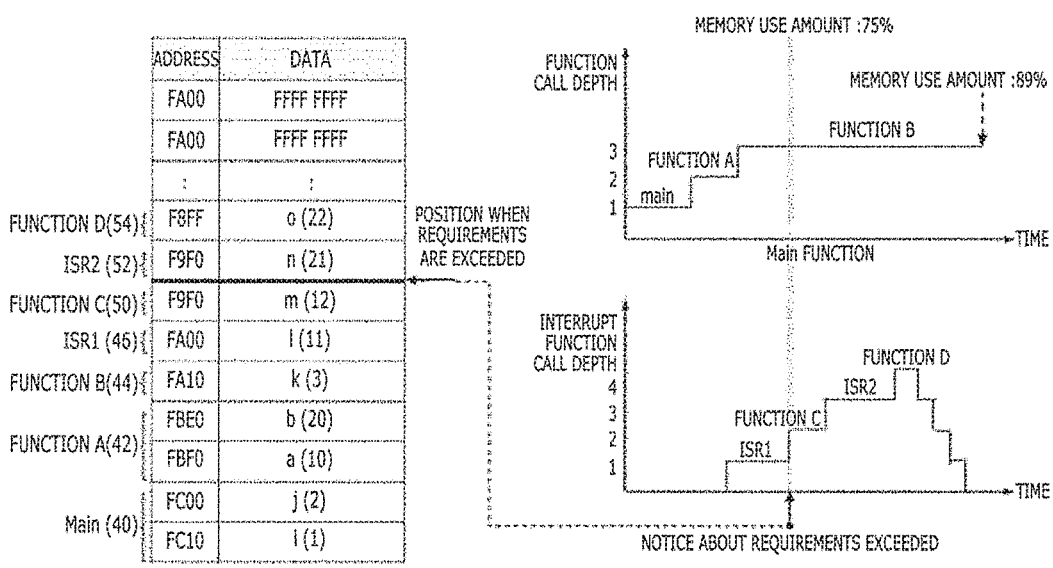
FIG. 9 shows the case in which functions in a program in a control system exceeds a recommended use amount of a memory according to an exemplary embodiment of the present disclosure.

FIG. 9 shows the case in which functions in a program in a control system exceeds a recommended use amount of a memory. In detail, a procedure of detecting a use situation of a memory through a probe code and determining whether requirements in a program are exceeded is described below.

As shown in the drawing, the control system is assumed to execute the program 40 and the plurality of ISRs 46 and 50 that are described with reference to FIGS. 6 and 7. In addition, an order in which the program 40 and the plurality of ISRs 46 and 50 are called may be assumed to be an order of the program 40, a function 42 and a function 44 in the program 40, an interrupt service routine ISR 46, a function 50 in the ISR 46, the ISR 52, and a function 54 in the ISR 52.

A stack area of a memory may be sequentially allocated to each program an ISR, and a function to a start position from an end position (an opposite order of an address) according to a call order. Here, a function of a program is performed, and thus, it may be assumed that 89% of an allocated stack area is used. For example, a memory use amount in a stack area may be checked in response to the probe code 68 described with reference to FIG. 6. Here, when the corresponding function 48 and the ISR 46 are performed, it may be assumed that requirements are less than 70% (threshold value). Upon checking that a stack area of a memory exceeds and uses a threshold value (75%) through the probe code 68 at a time point when a memory use area is checked after a stack area is allocated in response to calling the corresponding function 48, requirements that are exceeded may be recognized at a currently allocated position (stack point) at a corresponding time point.

This information may be displayed, and thus, a user (driver or manger) may predict that a larger amount of stack area is used or is to be used than a predetermined use amount in a control system (e.g., 89% of a stack area allocated by performing a function of a program is used) and may prevent an error from occurring or prevent an error via continuous monitoring.

Figure 10:
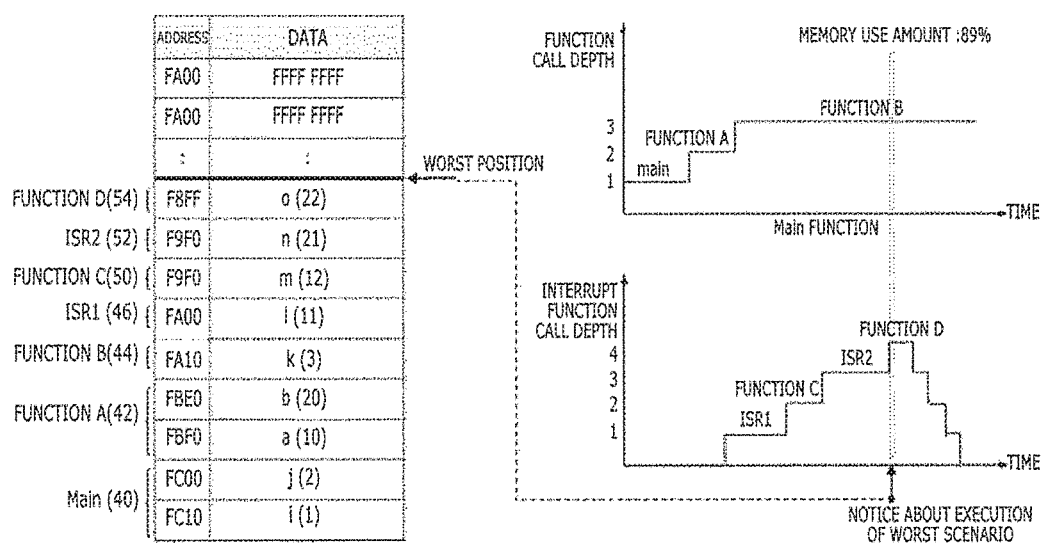
FIG. 10 shows a case in which functions in a program of a control system exceeds a memory use amount by which overflow is expected according to an exemplary embodiment of the present disclosure.

FIG. 10 shows a case in which functions in a program of a control system exceeds a memory use amount by which overflow is expected. FIG. 10 may assume that substantially the same program and interrupt service routine (ISR) as in FIG. 9 are performed. However, as shown in FIG. 9, when a user recognizes that memory use situation in a stack area in a memory exceeds a predetermined threshold value or even if the user recognizes, it is assumed that a program and an ISR are continuously performed without any measures to continuously increase a memory use amount.

It may be assumed that a control system continuously performs a program and an ISR and a current use amount of a stack area in a memory is reached to 89% by the probe code 70 described with reference to FIG. 6. Although the threshold value is 70%, the use amount is increased to 89%, and thus, the possibility that an error such as overflow occurs may be determined to be very high. In this case, estimating a worst scenario, the case in which a procedure or process for preventing an error, such as a fail-safe logic, needs to be performed may be displayed.

Figure 11:
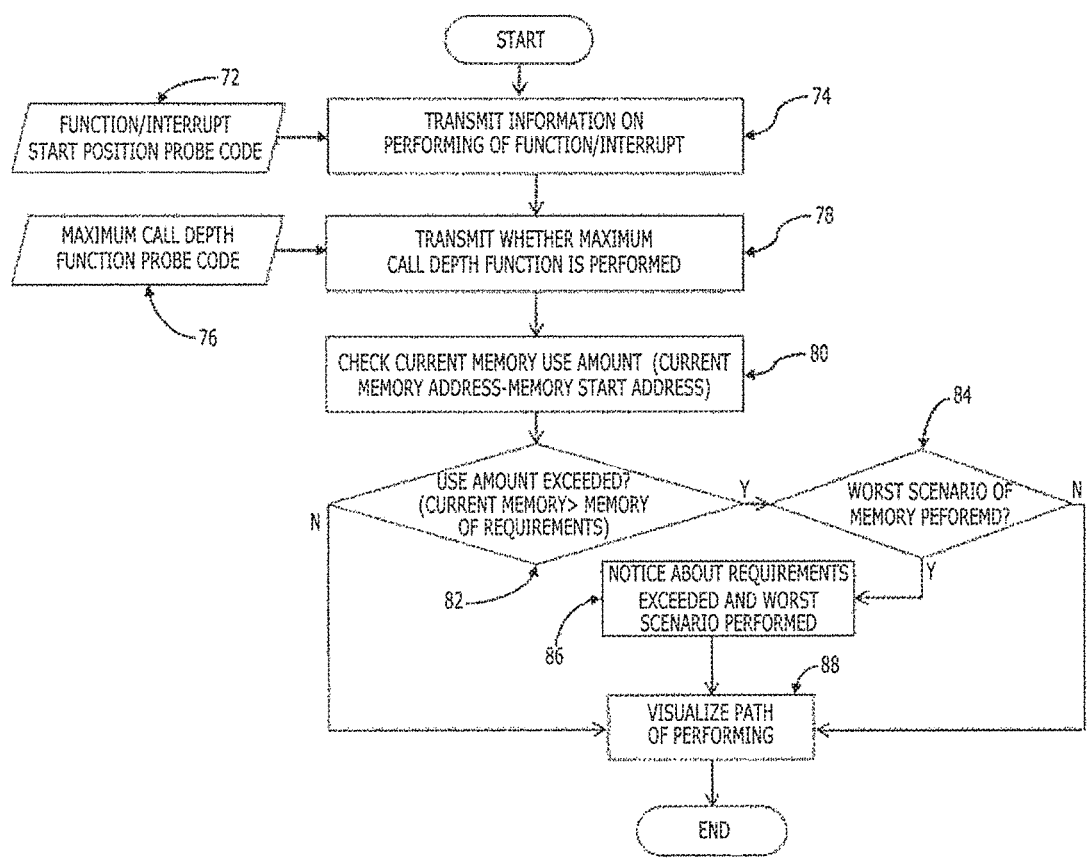
FIG. 11 shows a second example of an operating method of a control system according to an exemplary embodiment of the present disclosure.

FIG. 11 shows a second example of an operating method of a control system.

As shown in the drawing, a probe code may be inserted into a start position of a function or ISR performed by a control system (S72) and may be inserted into a function with a maximum call depth (S76).

Execution information of a function or ISR performed by a control system may be transmitted (S74). In this case, the execution information may include identification (ID) of a function or an interrupt service routine (ISR), positional information (e.g., stack point) at a memory after a stack area of a memory is allocated to a function or an ISR during call, and so on. When the execution information is transmitted whenever a function or an ISR is called and performed, a use amount of a stack area in a memory may be continuously monitored whenever the function or the ISR is called.

Then, whether a function with a maximum call depth is performed may be transmitted (S78). When the function with a maximum call depth is performed, a use amount of a stack area in a memory may be increased.

When the function with the maximum call depth is called and performed, a current use amount of a stack area in a memory may be checked (S80). In this case, the current use amount may be calculated through a difference (e.g., absolute value) between a current address in a stack area and a start address (e.g., a last address of a memory) of the stack area.

The calculated current use amount may be compared with a predetermined threshold value (e.g., required amount of memory) to check whether the current use amount is greater than the threshold value (S82). When the current use amount is less than the threshold value, a path by which the currently performed function or ISR is performed may be visualized or displayed (S88). In this case, the possibility that a stack area in a memory overflows may be very low.

When the current use amount is greater than the threshold value, whether the current use amount reaches or exceeds a degree by which a worst scenario is performed may be determined (S84). When a use amount of a stack area in a memory is close to a total amount of the stack area and is not required to be lowered, a path by which a currently performed function or ISR is performed may be visualized (e.g., table and graph, refer to FIGS. 9 and 10) and displayed (S88).

However, when the current use amount reaches a degree by which a worst scenario is performed, performing of a worst scenario (e.g., fail-safe logic) may be noticed to recognize that a memory use amount is exceeded in relation to a current use amount of a stack area in a memory and to prevent a problem such as overflow (S86).

Then, a path by which a logic, a function, or an ISR that is currently performed is performed in relation to a current use amount of a stack area in a memory may be visualized and displayed (S88).

Figure 12:
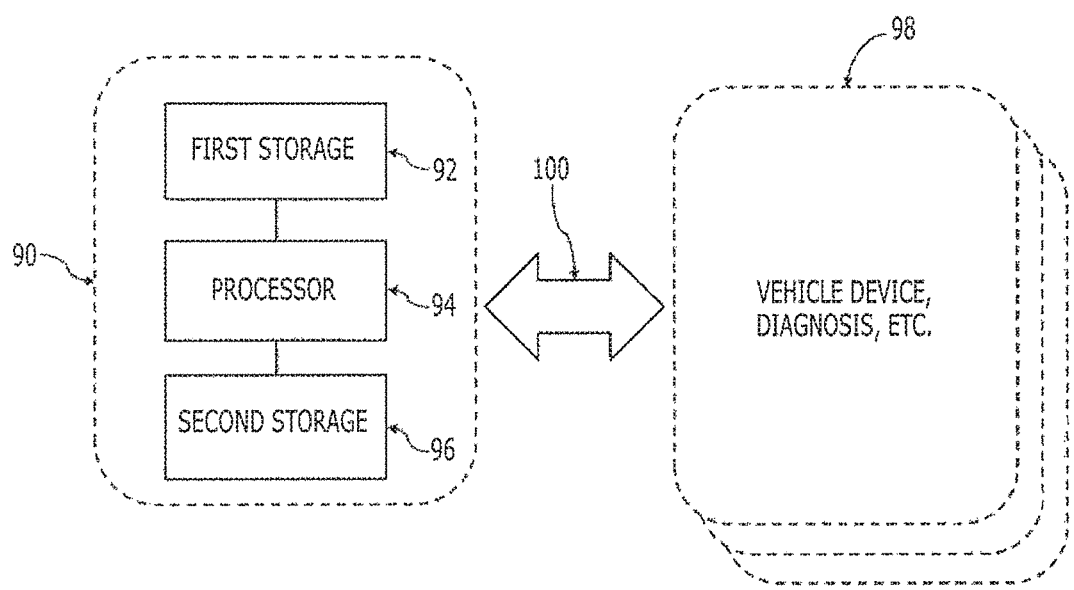
FIG. 12 is shows a configuration of a control system according to an exemplary embodiment of the present disclosure.

FIG. 12 is shows a configuration of a control system. Here, the control system may be a computing device for performing at least one program including a plurality of functions.

As shown in the drawing, the control system may include at least one first storage 92 for storing at least one program, at least one processor 94 for executing at least one program, and a second storage 96 for storing data or a value that is generated or required in a program of executing at least one program stored in the first storage 92.

In some embodiments, the first storage 92 may be a device for storing a program or the like even if power is not supplied and the second storage 96 may be a device for storing data and information generated by a program executed by the processor 94 when power is supplied to the control system.

In some embodiments, the first storage 92 and the second storage 96 may be embodied as one memory device or may be embodied as a plurality of physically separated memory devices.

A control system 90 may be a device or a diagnosis device 98 installed in a vehicle through a vehicle network 100.

A function call depth of a function executed by a program may be recognized through the at least one processor 94 in the control system 90. The processor 94 may execute a probe code inserted into a maximum depth function with a maximum function call depth and an interrupt service routine (ISR) and calculate a use amount of a memory area in the second storage when the maximum depth function with the probe code inserted thereinto is performed. When the probe code is performed, the processor 94 may output the function call depth and the current use amount when the function call depth with the maximum depth function or the interrupt service routine (ISR) is performed.

In some embodiments, the probe code may be inserted into a start and end of the maximum depth function and the interrupt service routine (ISR). Here, the ISR may be independently executed from a program.

Through the at least one processor 94, a threshold value of a use amount set in response to the transmitted function call depth may be compared with the transmitted use amount. According to the comparison result, the at least one processor 94 may perform a fail-safe logic. Here, the at least one processor 94 may perform a multi-processor or a multi thread.

Although not shown, a vehicle or a diagnosis device may further include a display device for displaying the reason and result of the fail-safe logic executed by the at least one processor 94 or displaying a function call depth, a use amount, and visualization information.

Here, an area for detecting a memory use amount may be a stack area. When a function executed by a program is called by the at least one processor 94, a stack area may be allocated to a corresponding function and, when the function is terminated, the stack may be returned to the system.

Through the at least one processor 94, a total amount may be determined using an allocated start address and end address of a stack area and a current use amount may be determined to a current address from a start address. Then, the at least one processor 94 may determine a user amount with a rate of the current use amount to the total amount.

Although not shown, the vehicle or the control system may further include a function identifier of the maximum depth function and the interrupt service routine (ISR), a function call depth, a transmitter for transmitting a use amount and visualization information, and an Ethernet port for transmitting the function identifier of the maximum depth function and the interrupt service routine (ISR), the function call depth, and the use amount and the visualization information.

As described above, according the embodiments of the present disclosure, an error in which a memory use amount exceeds requirements may be prevented. According the embodiments of the present disclosure, a memory use amount of a worst condition for indicating whether a worst scenario is performed may be measured, thereby preventing an error from occurring in a control system. In addition, according the embodiments of the present disclosure, data and materials for easily analyzing the reason of an error may be provided by memory requirements by visualization of a path by which software is executed.

The method according to the aforementioned embodiment can also be embodied as computer readable codes on a computer readable recording medium. Examples of the computer readable recording medium include read-only memory (ROM), random-access memory (RAM), CD-ROMs, magnetic tapes, floppy discs, optical data storage devices, etc.

The computer readable recording medium can also be distributed over network coupled computer systems so that the computer readable code is stored and executed in a distributed fashion. Also, functional programs, codes, and code segments for accomplishing the present disclosure can be easily construed by programmers skilled in the art to which the present disclosure pertains.

The apparatus according to the present disclosure may have the following effects.

The present disclosure may prevent a problem in terms of vehicle safety such as sudden unintended acceleration due to a malfunction of a vehicle control system.

In addition, the present disclosure may monitor use of a memory area by executing a program with respect to a memory area allocated to a program by a vehicle control system to enhance the program of the vehicle control system via debugging.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

It will be apparent to those skilled in the art that various modifications and variations can be made in the present disclosure without departing from the spirit or scope of the inventions. Thus, it is intended that the present disclosure cover the modifications and variations of this invention provided they come within the scope of the appended claims and their equivalents.

What is claimed is:

1. An operating method of an electronic control device for performing at least one program comprising a plurality of functions, the method comprising steps of:
   recognizing a function call depth of the plurality of functions;
   inserting a probe code into an interrupt service routine (ISR) and a maximum depth function with a maximum function call depth;
   calculating a use amount of a memory area when the maximum depth function with the probe code inserted into the maximum depth function is performed;
   when the probe code is executed, outputting the maximum function call depth or the function call depth of the plurality of functions and the use amount when the ISR is performed;
   comparing a threshold value of the use amount, which is set in response to the outputted function call depth, and the outputted use amount; and
   performing a fail-safe logic in response to a comparison result.

2. The method of claim 1, wherein the probe code is inserted into start and end positions of the maximum depth function and the ISR.

3. The method of claim 1, wherein the ISR is separately executed from the at least one program.

4. The method of claim 1, further comprising displaying reason and result of the fail-safe logic.

5. The method of claim 1, wherein the memory area is a stack area.

6. The method of claim 5, wherein the step of calculating the use amount comprises:
   determining a total amount of the use amount using allocated start and end addresses of the stack area;
   determining a current use amount using the use amount up to a current address from the start address; and
   determining a rate of the current use amount to the total amount.

7. The method of claim 1, further comprising displaying the function call depth of the plurality of functions, the use amount, and visualization information.

8. A non-transitory computer readable recording medium having recorded thereon an application program for executing the method of claim 1 by executing the program by a processor.

9. An electronic control device for executing at least one program comprising a plurality of functions, the electronic control device comprising:
   at least one first storage configured to storage the at least one program;
   at least one processor configured to execute the at least one program; and
   a second storage configured to store data or a value generated or required in a program of executing the at least one program stored in the first storage,
   wherein the at least one processor:
      recognizes a function call depth of a function executed by the program;
      executes a probe code inserted into an interrupt service routine (ISR) and a maximum depth function with a maximum function call depth;
      calculates a use amount of a memory area in the second storage when the maximum depth function with the probe code inserted into the maximum depth function is performed;
      compares a threshold value of the use amount, set in response to the outputted function call depth, and the outputted use amount; and
      performs a fail-safe logic in response to a comparison result
      outputs the maximum function call depth or the function call depth of the function executed by the program and the use amount when the ISR is performed, when the probe code is executed.

10. The electronic control device of claim 9, wherein the probe code is inserted into start and end positions of the maximum depth function and the ISR.

11. The electronic control device of claim 9, wherein the ISR is independently executed from the program.

12. The electronic control device of claim 9, further comprising a display device configured to display reason and result for performing the fail-safe logic or to display the function call depth, the use amount, and visualization information.

13. The electronic control device of claim 9, wherein the memory area is a stack area.

14. The electronic control device of claim 13, wherein, when a function executed by the program is called by the processor, the stack area is generated, and when the function is terminated, the stack area is returned.

15. The electronic control device of claim 13, wherein the at least one processor determines a total amount of the use amount using allocated start and end addresses of the stack area, determines a current use amount using the use amount up to a current address from the start address, and determines a rate of the current use amount to the total amount.

16. The electronic control device of claim 9, further comprising:
   a transmitter configured to transmit a function identifier of the maximum depth function and the ISR, the function call depth, the use amount, and visualization information through a wireless communication network; and
   an Ethernet port configured to transmit a function identifier of the maximum depth function and the ISR, the function call depth, the use amount, and visualization information.

17. The electronic control device of claim 9, wherein the second storage further comprises a data area for storing global, static, array, or structure and a heap area that is dynamically allocated as necessary; and
   wherein the function call depth is recognized through a depth first search (DFS) algorithm.

* * * * *